United States Patent [19]

Delmege et al.

[11] Patent Number: 4,581,699

[45] Date of Patent: * Apr. 8, 1986

[54] POWER TRANSMISSION

[75] Inventors: Arthur H. Delmege, Detroit; Yehia El-Ibiary, Troy; Melvin A. Rode, West Bloomfield; Lael B. Taplin, Union Lake, all of Mich.

[73] Assignee: Vickers, Incorporated, Troy, Mich.

[ * ] Notice: The portion of the term of this patent subsequent to Feb. 26, 2002 has been disclaimed.

[21] Appl. No.: 699,039

[22] Filed: Feb. 7, 1985

Related U.S. Application Data

[63] Continuation-in-part of Ser. No. 418,086, Sep. 14, 1982, Pat. No. 4,502,109.

[51] Int. Cl.$^4$ .......................... G05B 15/00; G05B 3/00
[52] U.S. Cl. ...................................... 364/174; 364/149
[58] Field of Search ............... 364/174, 175, 178, 149, 364/150, 151

[56] References Cited

U.S. PATENT DOCUMENTS

| | | | |
|---|---|---|---|
| 3,673,395 | 6/1972 | Tripp | 364/174 X |
| 3,967,515 | 7/1976 | Nachtigal et al. | 364/174 X |
| 4,396,975 | 8/1983 | Kurakake | 364/174 X |
| 4,502,109 | 2/1985 | Delmege et al. | 364/174 |

Primary Examiner—Jerry Smith
Assistant Examiner—Allen MacDonald
Attorney, Agent, or Firm—Barnes, Kisselle, Raisch, Choate, Whittemore & Hulbert

[57] ABSTRACT

An electro-hydraulic servo control system which has N dynamic state variables and includes a servo actuator adapted to variably position a load mass. An actuator control system includes sensors coupled to the actuator for providing indications of X measured state variables, such as actuator position and/or velocity, and a digital observer responsive to the X measured actuator variables for estimating the remaining N-X variables at the actuator such as velocity and/or acceleration. Signals indicative of measured and estimated state variables are fed to a comparator together with a state command signal, for obtaining a difference or error signal to provide a control input to the actuator. The observer electronics include digital computation means suitably programmed to estimate N state variables as solutions to N linear equations for N unknowns. Equation constants, which are functions of actuator and driven mass physical characteristics, are entered through operator-adjustable resistors or are down-loaded from a remote system into storage registers.

2 Claims, 8 Drawing Figures

POWER TRANSMISSION

This application is a continuation-in-part of application Ser. No. 418,086 filed Sept. 14, 1982 now U.S. Pat. No. 4,502,109, issued Feb. 26, 1985, and assigned to the assignee hereof, the disclosure of which is incorporated herein by reference.

The present invention relates to power transmissions, and more particularly to power servo control systems, e.g. electric, electro-pneumatic and/or electro-hydraulic servo control systems.

BACKGROUND OF THE INVENTION

It is conventional practice in the art of electro-hydraulic servo control systems to provide a command signal indicative of position, velocity, acceleration or pressure desired at the controlled mechanism, to measure actual position, velocity and acceleration of the controlled mechanism by means of corresponding transducers, and to drive a hydraulic actuator with an error signal representative of a difference between the command signal and the measured motion variables. Provision of three transducers mounted on or otherwise responsive to the controlled mechanism increases significantly the overall expense of the servo system while at the same time reducing overall reliability. The aforementioned deficiencies in the art are particularly acute in the field of industrial robotics where interest in cost, simplicity and reliability is continually increasing.

Barker, "Design of a State Observer For Improving the Response of a Linear Pneumatic Servo-Actuator", *Fluids in Control and Automation,* Paper C5 (1976) discusses design theory for an observer for estimating unmeasurable state variables in a pneumatic servo-actuated guidance control system. In addition to a mathematical analysis of the first order system state functions and eigenvalue assignment theory, the paper discloses a specific analog observer control system wherein a pneumatic servo actuator is controlled as a combined function of the actuator command signal, measured actuator position, and actuator velocity and acceleration estimated by the observer.

OBJECTS AND SUMMARY OF THE INVENTION

A general object of the present invention, therefore, is to provide a servo control system, specifically an electro-hydraulic servo control system, which is less expensive and more reliable than are the prior art systems of the type hereinabove discussed.

Another object of the present invention is to provide a servo control system adapted for general application in the electro-hydraulic field, and which may be readily adapted or programmed for specific hydraulic servo control applications.

A further object of the invention is to provide an electro-hydraulic servo control system which addresses the foregoing objects and which finds particular application in the field of manipulator control as in industrial robotics and mobile equipment such as front-end loaders and excavators, etc.

In accordance with the present invention, the foregoing and other objects are achieved by providing a servo actuator having N dynamic state variables and a control system which includes sensors or transducers for actually measuring X dynamic motion variables at the actuator less than all N variables, and observer electronics for estimating the remaining N-X desired state variables as a function of a mathematical model of dynamic behavior characteristics of the actuator and driven mass. In a preferred embodiment of the invention herein disclosed, actuator position is measured using a suitable sensor, and actuator velocity and acceleration are estimated based upon the actuator position signal and the input signal to the actuator, which is preferably an electro-hydraulic actuator. The resulting signals indicative of measured position, and estimated velocity and acceleration, are compared with a position command signal to provide a difference or error signal to be fed as the control input to the actuator.

Most preferably, the observer electronics take the form of digital computation means suitably designed or programmed to estimate position, velocity and acceleration as solutions to three corresponding linear equations with three unknowns. Equation constants, which are a function of actuator and driven mass physical characteristics, are preferably entered through operator-variable impedances, such as adjustable resistors. The measured actuator position and actuator input error signals are periodically sampled and stored as variable inputs to the observer electronics. The preferred embodiment of observer electronics herein disclosed also embodies a self-test feature to facilitate maintenance in the field.

The use of one rather than multiple transducers and sensors responsive to actuator/mass motion reduces significantly the cost and complexity of the overall system, and also increases overall system reliability. Overall system reliability is improved, particularly as applied to noisy environments and/or noisy sensors, by obtaining velocity and acceleration signals electronically rather than directly. Another important advantage of the invention is the ability to estimate an otherwise difficult to measure, essentially inaccessible state variable. One example of such a variable in manipulator applications is motion at the end of a flexible arm or the like. The observer may be readily programmed with a mathematical model of the flexible arm.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
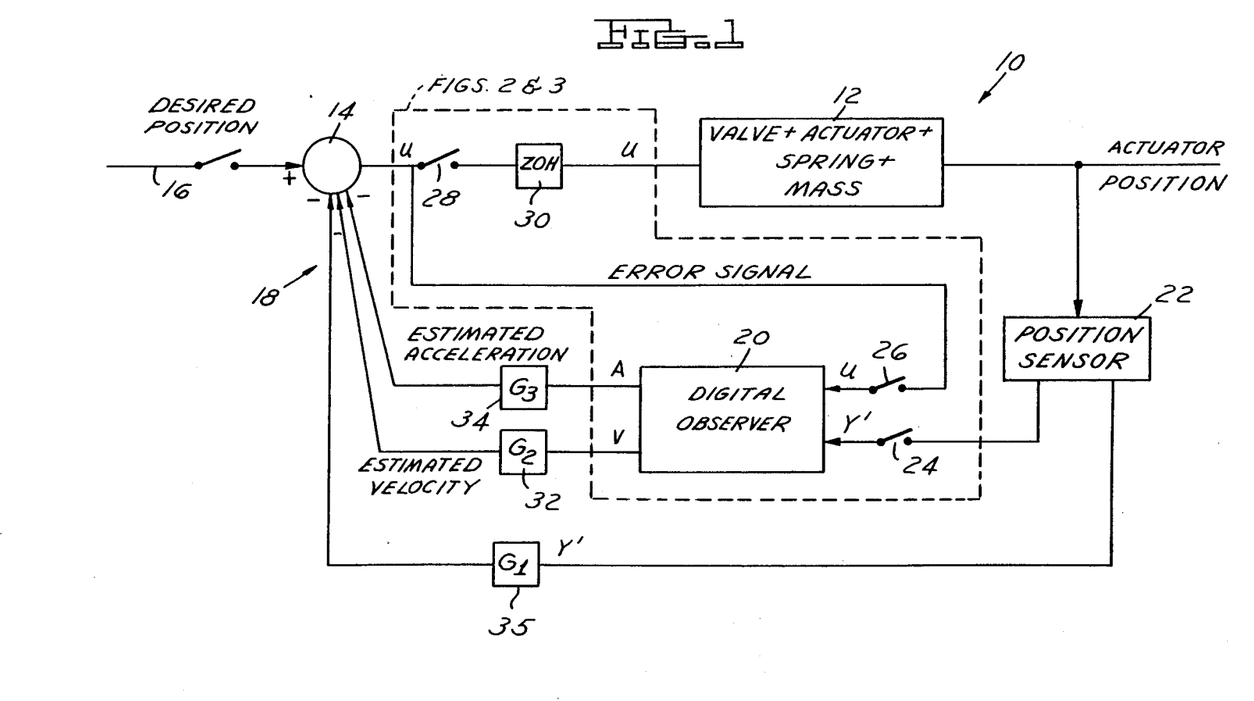
FIG. 1 is a functional block diagram of an electro-hydraulic servo control system in accordance with a presently preferred embodiment of the invention.

FIG. 1 illustrates a presently preferred embodiment 10 of an electro-hydraulic servo control system in accordance with the present invention as comprising a hydraulic actuator 12 of conventional construction. Actuator 12 would typically include a valve with a force motor which receives an electrical input control signal and applies hydraulic fluid to a spool, which in turn controls flow of fluid to an actuator mechanism that moves a load mass. A summation amplifier 14, which typically comprises a number of differential amplifiers, receives a position command signal on the line 16 from an external source (not shown) such as a potentiometer, a suitably programmed computer or a tape control mechanism, etc., and provides a control signal as the input to actuator 12 as a function of a comparison between the position command signal and the feedback signals on the lines 18 which are indicative of dynamic response at the actuator. Specifically, amplifier 14 receives signals indicative of position, velocity and acceleration at the actuator, and provides an input control signal to the actuator mechanism as a function of comparison between such dynamic motion-variable signals and the command signal.

In accordance with the present invention, at least some of the dynamic variable signals indicative of actuator motion fed to amplifier 14 are estimated by a digital observer 20 as a function of a mathematical model of dynamic behavior characteristics at the actuator. More specifically, a position sensor 22, which may comprise a variable resistor, a proximity transducer or the like, provides a signal Y' indicative of actuator position through a sampling switch 24 to observer 20. Likewise, the difference or error signal U at the output of amplifier 14 is fed through a sampling switch 26 as a second input to observer 20. Error signal U is also fed through a sampling switch 28 to a zero order hold amplifier 30, and thence to actuator 12. Observer 20 estimates velocity and acceleration at the actuator in a manner to be described hereinafter, and provides corresponding velocity and acceleration signals V and A to amplifier 14 through the respective gain blocks 32,34. The signal Y' indicative of measured actual position is fed from position sensor 22 through a gain block 35 to amplifier 14.

Figure 2:
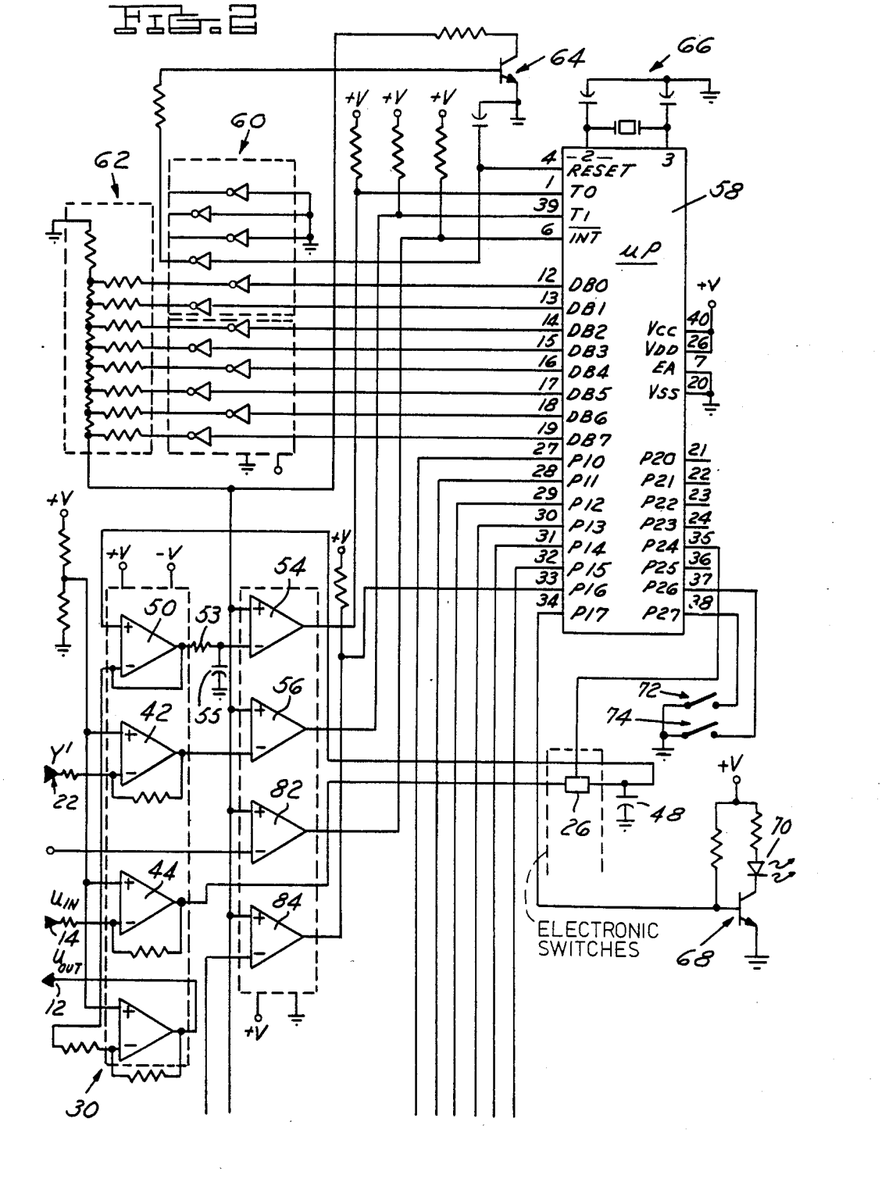
FIGS. 2 and 3 together comprise an electrical schematic drawing of the digital observer electronics package illustrated in block form in FIG. 1.
Figures 3, 4:
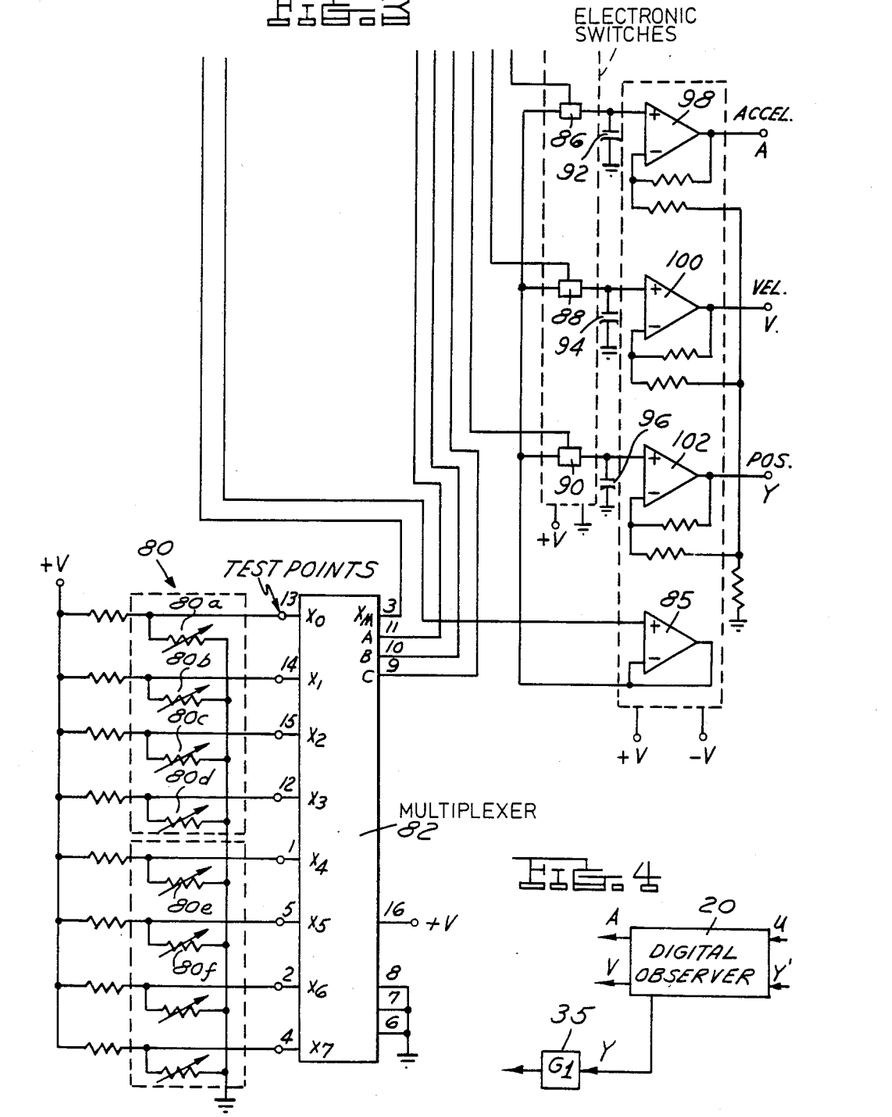
FIG. 4 is a fragmentary functional block diagram showing a modified embodiment of the servo control system of FIG. 1.

FIGS. 2 and 3 together illustrate that portion of the observer and actuator control electronics package in FIG. 1 enclosed by the phantom line. A pair of operational amplifiers 42,44 respectively receive the Y' position signal from sensor 22 (FIG. 1) and the U error signal from amplifier 14, and function to shift the voltage levels of the respective position and error signals from the $-V$ to $+V$ input level range to the zero to $+V$ level range of the observer internal logic. The level-shifted error signal output from amplifier 44 is fed through controlled electronic switch 26 (FIGS. 1 and 2), which may comprise an FET switch, and is stored on a capacitor 48. The level-shifted error signal so stored on capacitor 48 is fed to a unity gain amplifier 50 and to a level reshift and zero order hold amplifier 30 (FIGS. 1 and 2), and thence as an output to actuator 12 (FIG. 1). A pair of comparator 54,56 receive the respective position and error signal outputs of amplifiers 50,42, and provide respective corresponding outputs to data inputs T0,T1 of a microprocessor 58. Note that the output of amplifier 50 is fed to comparator 54 by a delay network comprising a series resistor 53 and a shunt capacitor 55. In the presently preferred embodiment of the invention herein described, microprocessor 58 comprises an Intel 8748 microprocessor.

The data outputs DB0 through DB7 of microprocessor 58 are connected through corresponding inverters in a packaged inverter array 60, and thence through resistor ladder network 62 to the reference inputs of comparators 54,56. As will be described in detail hereinafter, inverter array 60 and resistor ladder network 62 cooperate with comparators 54,56 to perform an analog-to-digital conversion of the input position and error signals, and also cooperate with circuitry yet to be described for performing a digital-to-analog conversion of the observer estimated acceleration, velocity and position output signals. The $\overline{RESET}$ output of microprocessor 58 is connected to ladder network 62 through an inverter in array 60 and through a transistor 64 for setting the output estimated signals at a zero level upon initiation of operation, as will be described. A crystal circuit 66 is connected to microprocessor 58 for providing internal clock timing. The P17 output port of microprocessor 58 is connected through a transistor 68 to an LED 70 for alternately energizing and extinguishing LED 70 so as to indicate continuing operation of the observer electronics to an operator. A pair of toggle switches 72,74 are connected selectively to ground corresponding microprocessor input ports P27,P26 for initiating a self-test operation in a manner to be described.

Turning to FIG. 3, a plurality of adjustable resistors 80 are connected to corresponding inputs of a multiplexer 82. Multiplexer 82 receives polling inputs A, B, C from output ports P10-P12 of microprocessor 58 (FIG. 2). Resistors 80 are for setting the input constants to the mathematical system model in microprocessor 58 in the manner to be described. The data output Xm of multiplexer 82 is connected to one input of a comparator 84 (FIG. 2), which receives a reference input from ladder network 62 and provides an output to the P16 input of microprocessor 58. Thus, inverter array 60 and ladder network 62 are adapted to cooperate with comparator 84 to perform an analog-to-digital conversion of the constant-indicative dc signals received from multiplexer 82. Ladder network 62 is also connected through a buffer amplifier 85 (FIG. 3) and thence through corresponding controlled electronic switches 86, 88, 90 to storage capacitors 92, 94, 96 at the inputs of the respective output amplifiers 98, 100, 102. Amplifiers 98, 100, 102 provide respective estimated acceleration, velocity and position signals A, V and Y. Switches 86, 88 and 90 are controlled by microprocessor output ports P15, P14 and P13 (FIG. 2).

As previously indicated in connection with FIG. 1, the presently preferred embodiment 10 of the invention contemplates an actuator position input to amplifier 14 as a function of measured position signal Y' indicated by position sensor 22. FIG. 4 illustrates a modified embodiment of the invention wherein estimated position Y at the output of amplifier 102 (FIG. 3) is fed to gain block 35 in place of the measured position signal Y'.

The mathematical model implemented by the observer feedback system for estimating state motion variables—i.e., position, velocity and acceleration—in accordance with the preferred embodiments of the invention hereinabove described is given by the following vector equation:

$$x_{k+1} = \phi x_k + \Gamma_k + D_k(Y_k' - Y_k) \qquad (1)$$

where $x_{k+1}$ is a common vector comprised of N state variables, in this example, position, velocity and acceleration at time (k+1), $x_k$ is the same column vector at time k—i.e. the preceding sampling interval, $D_k$ is a column vector of observer gains which may be set as desired depending upon desired location of the observer vector poles, $Y_k'$ is measured position at time k, and $Y_k$ is estimated position at time k.

$$\phi = e^{AT} \qquad (2)$$

where T is the sampling period and A is a three-by-three (N by N in the general case) constant matrix representing physical parameters of the controlled system. Constants in the matrix A are set by resistors 80.

$$\Gamma = \int_0^T \phi B \, dt \qquad (3)$$

where B is a one-by-three (1 by N) constant matrix.

$$\dot{x}_k = Ax_k + BU_k \qquad (4)$$

where $\dot{x}_k$ is the time derivative of x at time k and $U_k$ is the error signal at time k. As will be apparent to persons having ordinary skill in the art, the various above constants can be readily obtained following known techniques. See, for example, Kuo, *Digital Control Systems,* SRL Publishing Company (1977), page 456 et seq; Lindorff, *Theory of Sampled-Data Control Systems,* John Wiley & Sons (1965), page 191 et seq; and Franklin et al, *Digital Control of Dynamic Systems,* Addison-Wesley (1980), page 131 et seq. See also the above-noted Baker paper.

Figure 5:
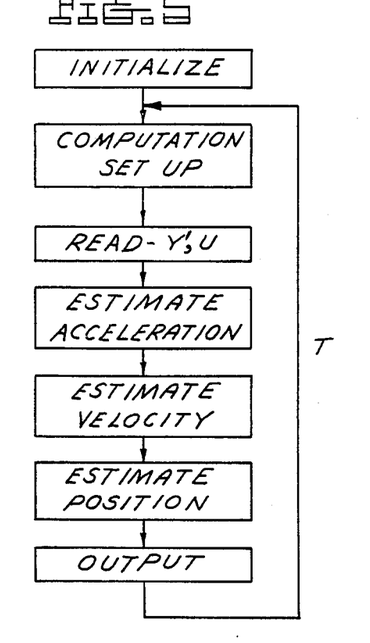
FIG. 5 is a flow diagram useful in understanding operation of the invention.
Figure 6:
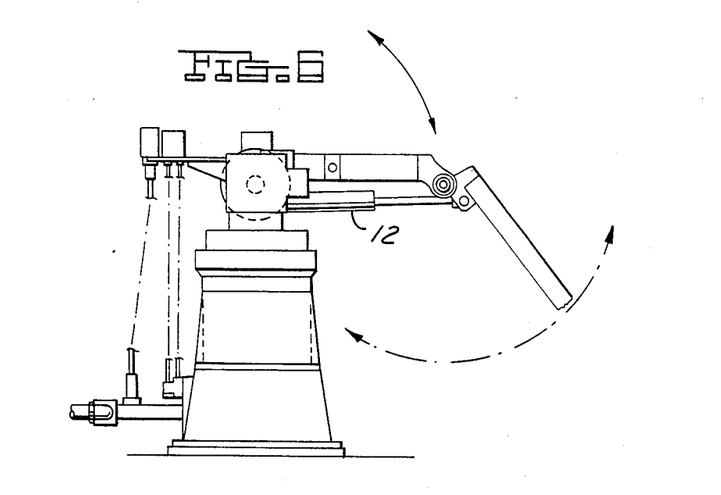
FIG. 6 is a fragmentary diagram of a robot manipulator arm in connection with which the electro-hydraulic servo control system of the present invention finds particular utility.

Operation of the digital observer electronics of FIGS. 1–3 will be best understood with reference to the flow diagram of FIG. 5. Upon start-up, the system is first initialized. During the initialization operation, constants in the column vector $D_k$ set by resistors 80 are sequentially subjected to analog-to-digital conversion and read into microprocessor 58. This analog-to-digital conversion is accomplished for each constant in sequence by varying the analog reference voltage at comparator 84 through inverters 60 and ladder network 62, and observing the digital state of the comparator output to set successive significant bits of the converted digital signal. Estimated acceleration, velocity and position at the outputs of amplifiers 98, 100 and 102 are initially set at a zero level during the initialization process. This is accomplished by the $\overline{\text{RESET}}$ output of microprocessor 58 operating in combination with ladder network 62 and buffer amplifier 85. A 2.5 volt analog signal (assuming 0 to 5 volt internal logic) is presented at each switch 86–90 and sequentially stored on capacitors 92–96 under control of microprocessor 58.

Following initialization, a computation set-up routine is entered. During each pass through the computation set-up routine, one of the constants represented by resistor 80 is re-entered by polling and appropriate adjustable resistor 80a through 80f as previously described. This continuous polling and re-calculation permits "on-the-fly" fine tuning of the servo system during operation. The actual position signal Y' and the error signal U are subjected to analog-to-digital conversion in the manner previously described and stored within microprocessor 58. The T-timer, which controls sampling at a preferred period of 0.75 milliseconds, is reset and an N-sampling counter is updated. The N-sampling counter functions alternately to energize or extinguish LED 70 as previously described upon occurrence of a specific number of sampling intervals to indicate continuing operation of the observer.

At the next stage of operation, acceleration A is estimated. Velocity and position are likewise successively estimated. A computation end routine output estimated acceleration, velocity and position to the sample-and-hold capacitors 92, 94, 96 (FIG. 3). Upon completion of the T-sampling time interval, operation recycles to the computation and set-up routine, and proceeds as previously described.

In addition to the several advantages of the preferred embodiments of the invention hereinabove set forth, a number of important features should be noted. For example, whereas an actual physical servo system is normally described by nonlinear differential equations, these equations have been linearized about the desired operating point in implementation of the invention. See Merritt, *Hydraulic Control Systems,* John Wiley & Sons (1967). The various constants which describe the linearized system may then be readily calculated per the above-cited references. These cited materials are incorporated herein by reference for the purpose of indicating background and state of the art.

Operational delays in conventional servo valves ordinarily would require four or five equations in order to estimate state motion variables, depending upon the transfer function of the valve. In accordance with an important feature of the present invention, the sampled error signal U is intentionally delayed within the observer electronics by the combination of resistor 53 and capacitor 55 to simulate the delay of the servo valve. This permits position, velocity and acceleration to be estimated on the basis of only three mathematical model equations.

Servo valves are flow limited and become saturated at some given input signal level. The observer model becomes saturated at a point corresponding to the same signal level to simulate the physical system.

It is contemplated that the preferred embodiment of the invention hereinabove described in detail may be susceptible to a variety of modifications and variations. One such modification has been described in connection with FIG. 4, where estimated position rather than measured position is used for control of actuator motion through comparator 14. It will also be appreciated that the digital implementation of the observer electronics hereinabove described in connection with FIGS. 2 and 3 could be replaced by suitable analog circuitry adapted to implement the mathematical model per equations (1)–(4). Although the invention has been described in detail in connection with the preferred implementation in an electro-hydraulic servo control system, other power servo systems, such as electric and electro-pneumatic systems, are also contemplated.

If desired, the observer electronics may be designed to estimate state variables other than motion variables, such as load pressure, torque motor current, etc. In addition, third and fourth order time derivatives of position, etc. may be estimated where desired. In these connections, it will be appreciated that the observer electronics may be designed in the broadest sense to estimate N state variables on the basis of N model equations.

Figure 7:
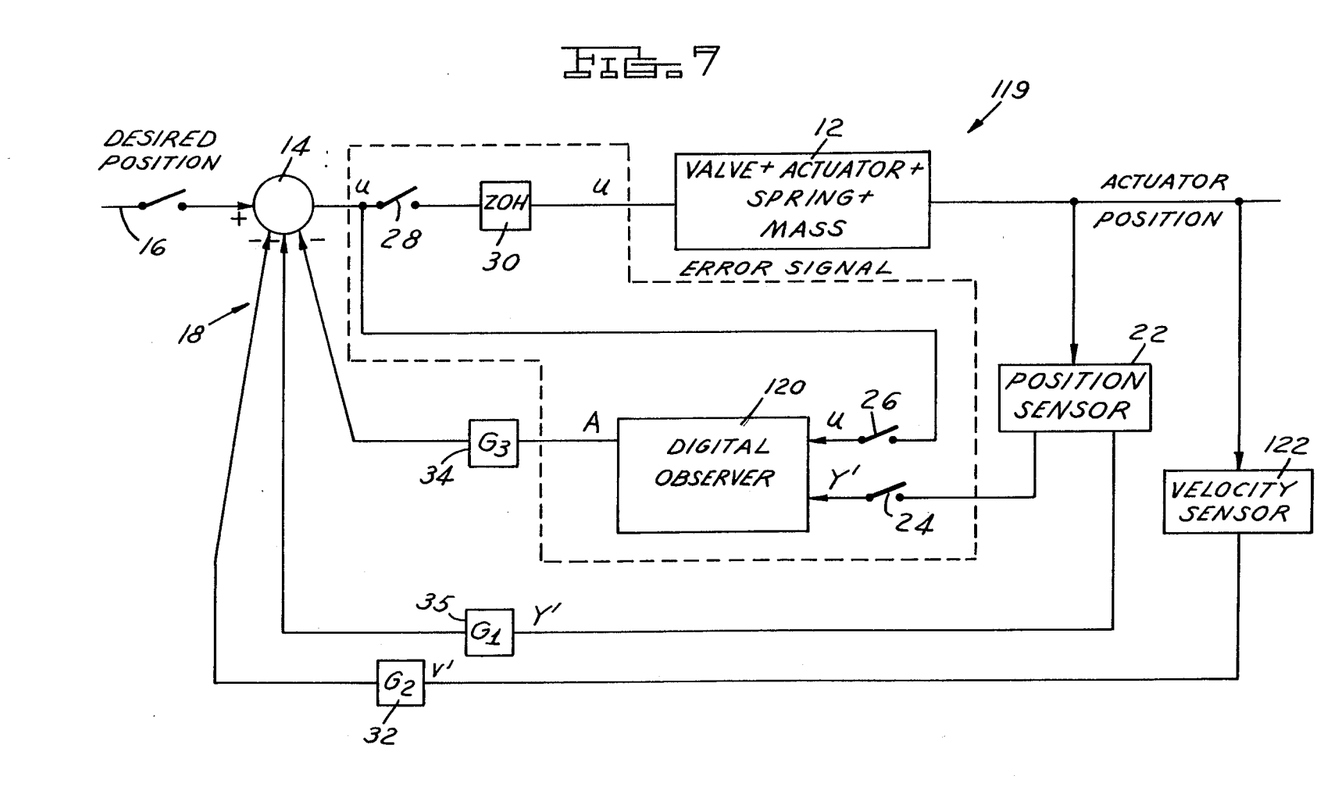
FIG. 7 is a functional block diagram similar to that of FIG. 1 showing a modified embodiment of the invention.

FIG. 7 illustrates a further modification 119 to the preferred embodiment of FIG. 1, featuring a reduced order observer 120. That is, a load-responsive velocity sensor 122 feeds a signal V' indicative of actual load velocity to gain block 32, and thence to summing amplifier 14, in place of the estimated velocity signal V of FIG. 1. Thus, in the embodiment of FIG. 7, two of the three required state variables, position and velocity, are actually measured and only one estimated state variable, acceleration, is employed for control purposes. (Internally, observer 120 may actually estimate all three state variables, as was the case in FIG. 1 although only two estimated variables were employed for control purposes.)

In the general case, the present invention finds application in power servo control systems responsive to a state position command signal and N dynamic state variable signals, with N being an integer greater than one. In accordance with the invention, sensor means are responsive to the servo actuator and load to provide first signals as a function of X dynamic state variables at the actuator and load, with X being an integer greater than zero but less than N. Observer means is responsive to such first signals for estimating the remaining N-X state variable signals as a function of a mathematical model of dynamic behavior at the actuator and load.

It will also be recognized that the state command signal need not be a position demand signal. Other embodiments of the invention not illustrated in the drawings contemplates velocity or acceleration demand signals, for example, or pressure demand signals at the actuator. In the latter case, the observer may estimate one or more derivatives of pressure, for example, based upon a mathematical model of the actuator.

Figure 8:
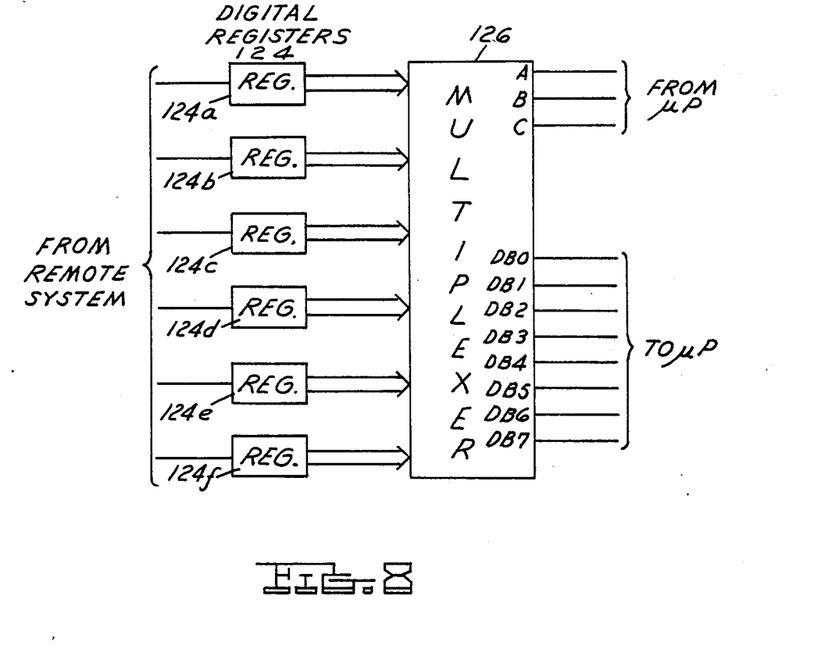
FIG. 8 is a fragmentary schematic diagram showing a further modification to the embodiment of FIGS. 1-3.

FIG. 8 illustrates a further modification to the preferred embodiment of FIGS. 1-3 in which the operator-adjustable resistors 80 (FIG. 3) are replaced by a corresponding plurality of digital registers 124 (a-f). Registers 124 may receive inputs indicative of system model constants from a remote system (not shown) and provide digital outputs to a multiplexer 126. Multiplexer 126 receives polling inputs A, B, C from the observer microprocessor, as in the embodiment of FIGS. 1-3, and provides bit-parallel outputs DB0-DB7 to the microprocessor. In addition to eliminating the operator-adjustable resistors and providing for remote downloading of system variables, the embodiment of FIG. 8 has the advantage of eliminating any requirement for A/D conversion of the constants during operation.

The invention claimed is:

1. A power servo system which includes an actuator adapted to variably position a load, means for receiving a state command signal, means for providing an error signal to control said actuator as a combined function of said state command signal and N dynamic state variable signals indicative of state conditions at said actuator and load, with N being an integer greater than one, and means responsive to state conditions at said actuator and load for providing said N variable signals comprising sensor means responsive to said actuator and load for providing first signals as a function of X dynamic state variables at said actuator, with X being an integer greater than zero but less than N; and observer means responsive to said first signals for estimating the remaining N-X of said N dynamic state variable signals at said actuator and load as a function of a mathematical model of dynamic behavior at said actuator and load, said observer means comprising means for periodically sampling said error signal and said first signals, adjustable means for selective adjustment as a function of said dynamic behavior at said actuator and load, and programmed digital computation means for selectively and periodically operating said sampling means, and responsive to the sampled error and first signals and to said adjustable means for estimating said N-X dynamic state variable signals.

2. The system set forth in claim 1 wherein said adjustable means comprises a plurality of digital storage means for receiving and storing signals indicative of dynamic behavior at said actuator and load, and wherein said observer means further comprises multiplexer means for selectively connecting outputs of said plurality of digital storage means to said programmed digital computation means.

* * * * *